United States Patent
Protz

(10) Patent No.: US 9,841,596 B2
(45) Date of Patent: Dec. 12, 2017

(54) LASER BEAM DIRECTING SYSTEM AND METHOD FOR ORIENTING OPTICAL COMPONENTS OF THE LASER BEAM DIRECTING SYSTEM

(71) Applicant: MBDA Deutschland GmbH, Schrobenhausen (DE)

(72) Inventor: Rudolf Protz, Hoehenkirchen-Siegertsbrunn (DE)

(73) Assignee: MBDA Deutschland GmbH, Schrobenhausen (DE)

(*) Notice: Subject to any disclaimer, the term of this patent is extended or adjusted under 35 U.S.C. 154(b) by 76 days.

(21) Appl. No.: 14/672,126

(22) Filed: Mar. 28, 2015

(65) Prior Publication Data

US 2015/0309304 A1 Oct. 29, 2015

Related U.S. Application Data

(63) Continuation of application No. PCT/DE2013/000578, filed on Oct. 9, 2013.

(30) Foreign Application Priority Data

Oct. 11, 2012 (DE) .................. 10 2012 019 940

(51) Int. Cl.
*G02B 26/08* (2006.01)
*G02B 7/182* (2006.01)
(Continued)

(52) U.S. Cl.
CPC ........ *G02B 26/0816* (2013.01); *G01S 7/4972* (2013.01); *G02B 7/1827* (2013.01); *G02B 26/101* (2013.01)

(58) Field of Classification Search
CPC .... G02B 26/06; G02B 26/08; G02B 26/0816; G02B 26/0825; G02B 26/10;
(Continued)

(56) References Cited

U.S. PATENT DOCUMENTS

| 2003/0174315 A1 | 9/2003 | Byren et al. |
| 2010/0128244 A1 | 5/2010 | Koehler et al. |
| 2012/0032065 A1* | 2/2012 | Armstrong ............ G01J 1/4257 250/201.9 |

FOREIGN PATENT DOCUMENTS

| DE | 60024223 T2 | 8/2006 |
| JP | 2000206243 A | 7/2000 |

(Continued)

*Primary Examiner* — Thomas K Pham
*Assistant Examiner* — Ibrahima Diedhiou
(74) *Attorney, Agent, or Firm* — Von Rohrscheidt Patents

(57) ABSTRACT

A laser beam directing system including a first deflection mirror which is connected with an elevation axis of the laser beam directing system; a primary laser which is coupleable into telescope optics by the first deflection mirror; a first auxiliary laser that is oriented in parallel to an azimuth rotation axis of the laser beam directing system; a second auxiliary laser that is oriented parallel to an elevation rotation axis of the laser beam directing system; and a first detector, wherein the first auxiliary laser, the second auxiliary laser and the first detector are arranged and oriented in the laser beam directing system so that the first deflection mirror is alignable by comparing beams of the first auxiliary laser and the second auxiliary laser impacting the first detector so that a beam from the primary laser is coupleable into the telescope optics parallel to the elevation rotation axis.

15 Claims, 2 Drawing Sheets

(51) Int. Cl.
 *G02B 26/10* (2006.01)
 *G01S 7/497* (2006.01)

(58) Field of Classification Search
 CPC .. G02B 26/101; G02B 26/105; G02B 6/3588;
 G02B 6/4208; G02B 7/1827; G02B 5/08;
 G02B 27/642; G02B 27/1827; G02B
 23/00; G02B 23/10; G01B 11/00; G01B
 11/002; G01B 11/26; G01B 11/27; G01B
 11/272; G01B 9/06; G01C 1/00; G01C
 21/18; G01C 21/28; G01C 3/00; G01C
 3/02; G01C 3/08; G01C 3/14; G01C
 3/20; G01D 5/305; G01D 5/341; G01S
 3/783; G01S 3/786; G01S 7/481; G01S
 7/4811; G01S 7/4812; G01S 7/4813;
 G01S 7/4972; G01S 7/1827; G01S 13/06;
 G01S 13/58; G01S 13/86; G01S 13/867;
 G01S 17/023; G01S 17/06; G01S 17/10;
 G01S 17/66; G01S 17/74; G01S 17/87;
 G01S 17/88; G01J 1/4257; F41G 1/30;
 F41G 1/36; F41G 1/38; F41G 3/06; F41G
 3/22; F41G 3/2246; F41G 3/2293; F41G
 3/30; F41G 3/326; F41H 13/005; F41H
 13/0062
 USPC ...... 359/221.2, 223.1, 226.2, 399, 401, 583,
 359/629, 639; 356/4.01, 18, 138, 139.05,
 356/141.1, 145, 152.1, 253; 398/156;
 251/201.1, 203.1, 203.2, 201.9, 339.02;
 372/9; 29/592; 42/114; 385/27, 31;
 342/52
 See application file for complete search history.

(56) References Cited

FOREIGN PATENT DOCUMENTS

| | | |
|---|---|---|
| JP | 2006189256 A | 7/2006 |
| JP | 2010148047 A | 7/2010 |

* cited by examiner

LASER BEAM DIRECTING SYSTEM AND METHOD FOR ORIENTING OPTICAL COMPONENTS OF THE LASER BEAM DIRECTING SYSTEM

RELATED APPLICATIONS

This application is a continuation of International patent application PCT/DE2013/000578 filed on Oct. 9, 2013 claiming priority from German patent application DE 10 2012 019 940.6 filed on Oct. 11, 2012, both of which are incorporated in their entirety by this reference.

FIELD OF THE INVENTION

The instant invention relates to a laser beam directing system and to a method for orienting optical components of the laser beam directing system.

BACKGROUND OF THE INVENTION

Telescope optics can be used in order to quickly direct a laser beam at a target which can move in an entire hemisphere. The telescope optics can expand a beam coming from the laser and can also focus the beam. Furthermore the laser beam can be tracked to the target by a beam directing unit. Beam directing units of this type typically have two axes of rotation that are moved in azimuth and elevation.

The laser beam can thus be directed in the beam directing unit by plural deflection mirrors in a so called Coude beam control unit from a locally fixated primary laser to the telescope optics that move about the two axes.

In order to assure highly precise directing of the laser beam with a system of the type described supra an exact alignment of the deflection mirrors in the Coude optical channel is required.

In conventional directing systems a very rigid mechanical assembly with high mass is required in order to provide an exact orientation of the deflection mirrors even when the directing system is in motion, thus under dynamic loads. Thus directing systems of this type can have a high level of inertia. Furthermore an adjustment of the beam path during operations is not possible.

Therefore there is a long felt need for an improved laser beam directing system and a method for orienting optical components of the laser directing system which facilitate in particular quick and exact directing of the primary laser beam even over longer time periods.

BRIEF SUMMARY OF THE INVENTION

The object is achieved by a laser beam directing system including a first deflection mirror which is attached at the laser beam directing system and moves with the laser beam directing system about an elevation axis of the laser beam directing system: telescope optics; a primary laser which is coupleable into telescope optics by the first deflection mirror; a first auxiliary laser that is oriented in parallel to an azimuth rotation axis of the laser beam directing system; a second auxiliary laser that is oriented parallel to an elevation rotation axis of the laser beam directing system; a first detector; and a first beam splitter component, wherein the first auxiliary laser, the second auxiliary laser and the first detector are arranged and oriented in the laser beam directing system so that the first deflection mirror is alignable by comparing beams of the first auxiliary laser and the second auxiliary laser impacting the first detector so that a beam from the primary laser is coupleable into the telescope optics parallel to the elevation rotation axis, and wherein the first beam splitter component is configured to decouple a first portion of the beams of the first auxiliary laser at a right angle onto the first detector and to let a second portion of the beams of the first auxiliary laser pass through.

The object is also achieved by a method for orienting the first deflection mirror, a second deflection mirror, a third deflection mirror and a fourth deflection mirror of the laser beam directing system including the steps operating the first auxiliary laser which is aligned parallel to the azimuth rotation axis of the laser beam directing system; operating the second auxiliary laser which is aligned parallel to the elevation rotation axis of the laser beam directing system; determining a first angle of incidence of a beam from the first auxiliary laser on the first detector; determining a second angle of incidence of a beam from the second auxiliary laser on the first detector; and adjusting the first deflection mirror, the second deflection mirror, the third deflection mirror and the fourth deflection mirror of the laser beam directing system so that the first angle of incidence is identical with the second angle of incidence.

Advantageous embodiments of the instant invention are described in the dependent claims.

Subsequently features, details and advantages of a device according to embodiments of the invention are discussed in detail.

According to a first aspect of the invention a laser beam directing system is provided. The laser beam directing system includes a first deflection mirror which is connected with an elevation axis of the laser beam directing system. Furthermore the laser beam directing system includes a primary laser which can be coupled into telescope optics by a first deflection mirror. Furthermore the laser beam directing system includes a first auxiliary laser and a second auxiliary laser. The first auxiliary laser is oriented in parallel to an azimuth axis of the laser beam directing system. The second auxiliary laser is oriented parallel to an elevation rotation axis of the laser beam directing system. Furthermore the laser beam directing system includes a first detector. Thus, the first auxiliary laser, the second auxiliary laser and the first detector are arranged and oriented in the laser beam directing system so that the first deflection mirror is alignable by comparing the beams of the first auxiliary laser and the second auxiliary laser impacting the first detector so that a primary laser beam can be coupled into the telescope optics parallel to the elevation rotation axis.

Put differently the core idea of the instant invention is to provide in addition to the primary laser two auxiliary lasers that are fixated in place and oriented parallel to the rotation axes of the laser beam directing system wherein the auxiliary lasers are deflected by optical components of the laser beam directing system to a first detector. At the first detector arriving beams impacting the first detector, in particular the angles of incidence, the tiltings and/or the positions of incidence are compared with one another. Subsequently the laser beam directing system can readjust the optical components, in particular the deflection mirrors, so that the first auxiliary laser beam coincides with the second auxiliary beam at the first detector, this means the laser beam directing system can perform a differential measurement to determine a deviation from the orthogonality of the beam path and it can adjust the optical components so that orthogonality is re-established.

After performing the adjustment using the auxiliary lasers and the first detector, a path of the primary laser beam parallel to the rotation axes of the system is assured. This facilitates a highly precise orientation of the laser beam. Based on the configuration of the laser beam directing system an alignment of the first deflection mirror can be provided with a precision of approximately 1 to 5 micro rad relative to the two rotation axes of the laser beam directing system. Furthermore the auxiliary lasers and the first detector facilitate a permanent readjustment of the orientation of the first deflection mirror with the required precision. In particular the first deflection mirror and other optical components of the laser beam directing system can also be checked during operation of the laser beam directing system and can be readjusted as required.

The laser beam directing system can be used for astronomical or military purposes, thus the laser beam directing system is configured as a two axis system with an azimuth rotation axis and an elevation rotation axis.

The laser beam directing system includes different optical components for routing the primary laser beam. The first deflection mirror is an optical component of this type. Furthermore additional deflection mirrors can be provided in the laser beam directing system. The first deflection mirror is thus moved together with the elevation axis. Additional deflection mirrors like, for example, a second deflection mirror, a third deflection mirror, and a fourth deflection mirror can be mounted in an azimuth rotation yoke of the laser beam directing system. Additional optical components of the laser beam directing system can be for example beam splitter components or coplanar plates.

Through the deflection mirrors the primary laser beam is coupled into telescope optics. The telescope optics are configured to expand and to focus the primary laser beam.

The auxiliary lasers are positioned spatially fixated in the laser beam directing system and are respectively oriented parallel, this means collinear to the azimuth axis and the elevation axis of the second laser beam directing system. For example the second auxiliary laser can be fixated in the azimuth rotation yoke. The orientation of the auxiliary lasers parallel to the rotation axes is thus performed with high precision and before adjusting the optical components.

The first detector can be configured as beam orientation sensor or as a camera, in particular the detector can be configured as a Hartmann-Shack sensor. The first auxiliary laser, the second auxiliary laser and the first detector are thus arranged in the laser beam directing system and oriented so that the first auxiliary laser beam and the second auxiliary laser beam impact the first detector.

One of the auxiliary laser beams, for example the second auxiliary laser beam, is thus directed by the first deflection mirror onto the detector so that a comparison of the angles of incidence of the laser beams provides information regarding an orientation of the first deflection mirror. The beams of the first auxiliary laser and of the second auxiliary laser which impact the detector are evaluated, for example, by a control unit. Furthermore, the control unit can, for example, control an adjustment motor which adjusts the first deflection mirror so that the first auxiliary beam and the second auxiliary beam coincide on the first detector.

When the optical components of the laser beam directing system are oriented accordingly, then the path of a primary laser beam is oriented between the individual optical components parallel to the rotation axes. Thus, the primary laser beam is coupled in parallel to the elevation rotation axis into the telescope optics.

According to one embodiment of the invention the first deflection mirror has a dielectric coating. The dielectric coating is configured so that the first deflection mirror is reflective and in particular highly reflective for the primary laser and partially reflective for the auxiliary lasers. Thus, the first deflection mirror can have a dielectric coating on one side or on both sides. Depending on the angle of incidence of the auxiliary laser beams these are transmitted or reflected.

Also, additional optical components like the second deflection mirror, the third deflection mirror, and the fourth deflection mirror can have a respective dielectric coating. In a known embodiment of a laser beam directing system without auxiliary lasers and detectors only metal coated mirrors can be used.

According to another embodiment of the invention the primary laser has a first wavelength. The first auxiliary laser has a second wavelength and the second auxiliary laser has a third wavelength. Thus, the first wavelength differs from the second wavelength and from the third wavelength. This means the primary laser is operated with a different wavelength than the auxiliary lasers. Thus an alignment or an adjustment of the optical components of the laser beam directing system can also be performed during operations of the primary laser.

In particular the second wavelength and the third wavelength can either be identical or different. The primary laser can be operated, for example, with a wavelength of 1070 nm. The first auxiliary laser can be operated for example with a wavelength of 532 nm or 635 nm. By the same token the second auxiliary laser can be operated with a wavelength of 532 nm or 635 nm.

According to another embodiment of the invention at least one adjustment element is provided at the first deflection mirror. The adjustment element is configured to adjust an inclination angle or an orientation of the first deflection mirror in the azimuth rotation axis and in the elevation rotation axis. This means the adjustment element is used to tilt the first deflection mirror about the azimuth axis and about the elevation rotation axis. Put differently the adjustment element is configured to adjust the deflection mirror about two axes in three dimensions.

The adjustment element can be controlled, for example, by a control unit. Thus, the adjustment element can be, for example, a piezo motor or a magnetic adjustment element. In particular two adjustment elements can be provided at the first deflection mirror. An adjustment element can adjust the first deflection mirror with reference to the azimuth rotation axis and a second adjustment element can adjust the first deflection mirror with reference to the elevation rotation axis.

Furthermore a separate adjustment element can be provided at each optical component of the laser beam directing system. In particular adjustment elements can be provided at the second, third, and fourth adjustment mirrors.

According to another embodiment of the invention the first auxiliary laser is operable simultaneously, this means in parallel with the second auxiliary laser or time sequential with the second auxiliary laser. For example, when both auxiliary lasers have the same wavelength it can be useful to operate the auxiliary lasers in a time sequential manner in order to be able to associate measuring results on the first detector with the respective auxiliary laser in a simpler manner. Thus both auxiliary lasers have different wavelengths so that they can be operated simultaneously which facilitates a quicker adjustment of the first deflection mirror.

According to another embodiment of the invention, the laser beam directing system also includes a control unit. The control unit is configured to determine a first angle of incidence of the first auxiliary laser or the first auxiliary laser beam and a second angle of incidence of the second auxiliary laser or the second auxiliary laser beam on the first detector. The control unit is configured to adjust the first deflection mirror by means of the adjustment element so that the first angle of incidence is identical to the second angle of incidence. Additionally or alternatively the control unit can bring a detection spot of the first auxiliary laser on the first detector in coincidence with the detection spot of the second auxiliary laser on the first detector.

According to another embodiment of the invention the laser beam directing system includes a first beam splitter component. The first beam splitter component is configured to decouple a first portion of the first auxiliary laser beam at a right angle onto the first detector and to let a second portion of the first auxiliary laser beam pass through. Furthermore the first beam splitter component is configured to decouple a first portion of the second auxiliary laser beam at a right angle onto the first detector.

The beam splitter component also designated as beam splitter cube can have a diagonal mirror surface and can be arranged in a direct beam path of the first auxiliary laser. Through the diagonal mirror surface, a few percent of the first auxiliary laser beam can be coupled out onto the first detector. The second auxiliary laser beam can be deflected by the first deflection mirror to the first beam splitter component. At the diagonal mirror surface of the beam splitter component the second auxiliary laser beam or a portion of the second auxiliary laser beam can be deflected at a right angle which is 90 degrees relative to the first detector.

Furthermore the laser beam directing system can include a second detector and a second beam splitter component. The second beam splitter component can thus be configured similar to the first beam splitter component and can be arranged in a direct beam path of the second auxiliary laser. Thus, the second beam splitter component can decouple a first portion of the second auxiliary laser beam at a right angle onto the second detector and can let a second component of the second auxiliary laser beam pass through. Furthermore the second beam splitter component can be configured to couple a first portion of the first auxiliary laser beam at a right angle onto the second detector. Thus, an additional comparison measurement can be performed to check the orientation of the first deflection mirror.

According to another embodiment of the invention the laser beam directing system furthermore includes a coplanar plate. The first coplanar plate is arranged physically fixated in the azimuth rotation axis of the laser beam directing system. In particular the first coplanar plate can be fixated at the azimuth rotation yoke. Thus, the first coplanar plate is configured partially reflecting for the first auxiliary laser and for the second auxiliary laser. This means the first coplanar plate reflects a first portion of a radiation of the first auxiliary laser and a first portion of the radiation of the second auxiliary laser. Furthermore, an orientation of the first auxiliary laser parallel to the azimuth axis of the laser beam directing system is adjustable by means of the first coplanar plate, the first beam splitter component and the first detector.

In particular the first coplanar plate is fixated at the azimuth rotation yoke so that the first coplanar plate is precisely orthogonal to the azimuth rotation axis. The first auxiliary laser is oriented orthogonal to the first coplanar plate. The orientation can be controlled by the first beam splitter component and by the first detector. The beam of the first auxiliary laser impacts the first beam splitter component, wherein a first portion of the radiation orthogonal to the first detector is coupled out and a second portion of the radiation is transmitted. The transmitted portion is reflected back into itself by the first coplanar plate and also coupled out by the first beam splitter component onto the first detector. Using the first detector, a tilting of the received beams relative to one another can be determined. Subsequently the first auxiliary laser can be adjusted so that the tilting of the two beams is identical.

Furthermore, a second coplanar plate can be provided in the laser beam directing system. The second coplanar plate can be arranged spatially fixated in the elevation axis. Thus, the second coplanar plate can be firmly connected with the support of the telescope optics. Furthermore the second coplanar plate can be oriented exactly orthogonal to the elevation rotation axis. The second auxiliary laser is oriented orthogonal to the second coplanar plate. The orientation can be checked analogously to the procedure described supra by a second beam splitter component and a second detector.

According to another embodiment of the invention, the laser beam directing system includes a first aperture. The first aperture is configured close to the first coplanar plate. When the first aperture is closed the first auxiliary laser beam is not routed to the deflection mirrors of the system so that only the second auxiliary laser beam can be evaluated for example by a second detector. This can be useful, for example, when adjusting the second, the third, and fourth deflection mirrors. In front of the second coplanar plate, a second orifice can be provided. This second orifice can prevent a deflection of the second auxiliary laser beam by deflection mirrors.

According to another embodiment of the invention, the laser beam directing system furthermore includes a second detector. The second detector is arranged in the laser beam directing system so that the first deflection mirror is alignable by comparing the beams of the first auxiliary laser and the second auxiliary laser impacting the second detector so that a primary laser beam can be coupled into the telescope optics parallel to the elevation rotation axis. The second detector can be used for controlling the measurement with the first detector. Furthermore, a more precise alignment of the first deflection mirror can be obtained by adjusting the first deflection mirror based on measurements of the first detector and the second detector.

According to another embodiment of the invention the laser beam directing system furthermore includes a second deflection mirror, a third deflection mirror and a fourth deflection mirror. The second deflection mirror and the third deflection mirror and the fourth deflection mirror are mounted at an azimuth rotation yoke of the laser beam directing system. The first auxiliary laser, the second auxiliary laser, and the first detector are arranged in the laser beam directing system so that the second deflection mirror, the third deflection mirror, and the fourth deflection mirror are alignable by comparing the beams of the first auxiliary laser and the second auxiliary laser impacting the first detector so that a primary laser beam extends parallel to the azimuth rotation axis and parallel to the elevation rotation axis in the laser beam directing system.

The advantages and embodiments recited in combination with the adjustment of the first deflection mirror apply analogously for the adjustment of the second, the third, and the fourth deflection mirrors. For example, the orientation of these deflection mirrors can also be controlled or checked using the second detector.

According to another embodiment of the invention the laser beam directing system includes a third detector. Furthermore, the first deflection mirror includes a beam splitter element on a back side. The beam splitter element is configured so that a portion of the beams of the first and the second auxiliary laser transmitted through the first deflection mirror is deflected onto the third detector. The deflection can thus be performed at an angle of 30°. Thus, for example, an optical diffraction grating can in integrated on a backside of the first deflection mirror. The values determined at the third detector provide another control option for the angular position of the first deflection mirror.

According to a second aspect of the invention a method for orienting optical components, in particular, deflection mirrors of a laser beam directing system described supra is introduced. The method includes the following steps: operating a first auxiliary laser which is aligned in parallel with an azimuth rotation axis of the laser beam directing system; operating a second auxiliary laser which is aligned parallel to an elevation rotation axis of the laser beam directing system; determining a first angle of incidence and/or an incidence position of the first auxiliary laser beam on a first detector; determining a second angle of incidence and/or an incidence position of the second auxiliary laser beam on the first detector; and adjusting the optical components of the laser beam directing system so that the first angle of incidence is identical with the second angle of incidence.

Thus, for example, the first deflection mirror can be adjusted so that a primary laser beam can be coupled into the telescope optics parallel to the elevation rotation axis.

According to another embodiment of the invention adjusting or readjusting the optical components is performed dynamically, this means the optical components can be aligned or readjusted during operation of the laser beam directing system and, in particular, during operation of the primary laser. Alternatively or additionally, the optical components can be aligned in a static manner before starting up the laser beam directing system.

According to another embodiment of the invention the method further includes aligning the first auxiliary laser parallel to the azimuth rotation axis of the laser beam directing system and aligning the second auxiliary laser parallel to the elevation rotation axis of the laser beam directing system. These steps can be performed advantageously before adjusting or aligning the optical components of the laser beam directing system.

Additional features and advantages of the instant invention are evident to a person skilled in the art from a subsequent description of advantageous embodiments which, however, do not limit the scope of the invention and are to be interpreted with reference to the appended drawing figure.

BRIEF DESCRIPTION OF THE DRAWINGS

Embodiments of the invention are subsequently described with reference to the drawing figures, wherein.

DETAILED DESCRIPTION OF THE INVENTION

Figure 1:
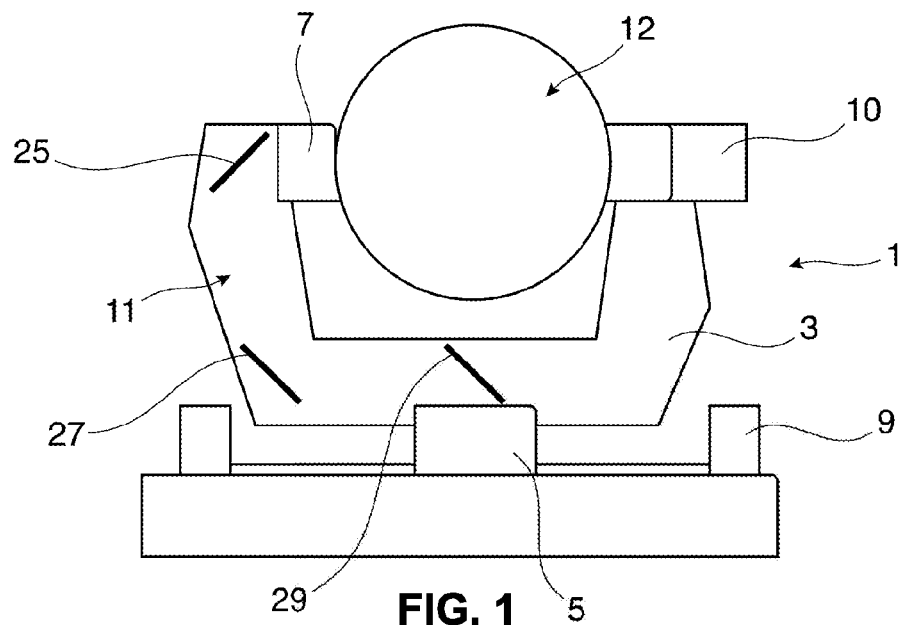
FIG. 1 illustrates a schematic of a laser beam directing system according to the invention.

All figures are mere representations of devices according to the invention or their components according to embodiments of the invention. In particular distances and size relationships in the figures are not represented according to scale. In different figures equivalent elements are provided with identical reference numerals.

FIG. 1 illustrates a laser beam directing system for quickly directing a primary laser beam at a target which can move in an entire hemisphere. The primary laser beam is introduced by mirrors that are not visible in FIG. 1 into the Coudéoptical channel. In the Coudéoptical channel 11 the primary laser beam is routed by a fourth deflection mirror 29, a third deflection mirror 27 and a second deflection mirror 25 to telescope optics 12. The primary laser beam is coupled into the telescope optics 12 by a first deflection mirror 23 which is not visible in FIG. 1. In the telescope optics 12, the primary laser beam is expanded and focused.

Using the laser beam directing system 1, the primary laser can be track a moving target. For this purpose the laser beam directing system 1 includes an azimuth rotation yoke 3 which is supported in an azimuth bearing 5 and rotatable about an azimuth axis by means of an azimuth motor 9. Furthermore the laser beam directing system 1 includes an elevation support 7 at which the telescope optics 12 are rotatable about an elevation axis by means of an elevation motor 10.

A precise adjustment of the deflection mirrors 23, 25, 27, 29 is required in order to provide a highly precise alignment of the primary laser beam with the target. It is particularly advantageous when the primary laser beam extends parallel to the rotation axes of the laser beam directing system 1. The highly precise alignment is provided through the configuration of the laser beam directing system 1 with auxiliary lasers 19, 21 and detectors 15, 17. This will be described in more detail with reference to FIG. 2. Thus the configuration of the laser beam directing system 1 according to the invention facilitates a dynamic readjustment of the deflection mirrors 23, 25, 27 and 29 so that a precise laser directing is also provided over longer time periods and for a moving laser directing system 1, thus under dynamic loads. Thus, the deflection mirrors 23, 25, 27 and 29 can be aligned with a precision of a few micro rad relative to the two rotation axes of the laser beam directing system 1.

Figure 2:
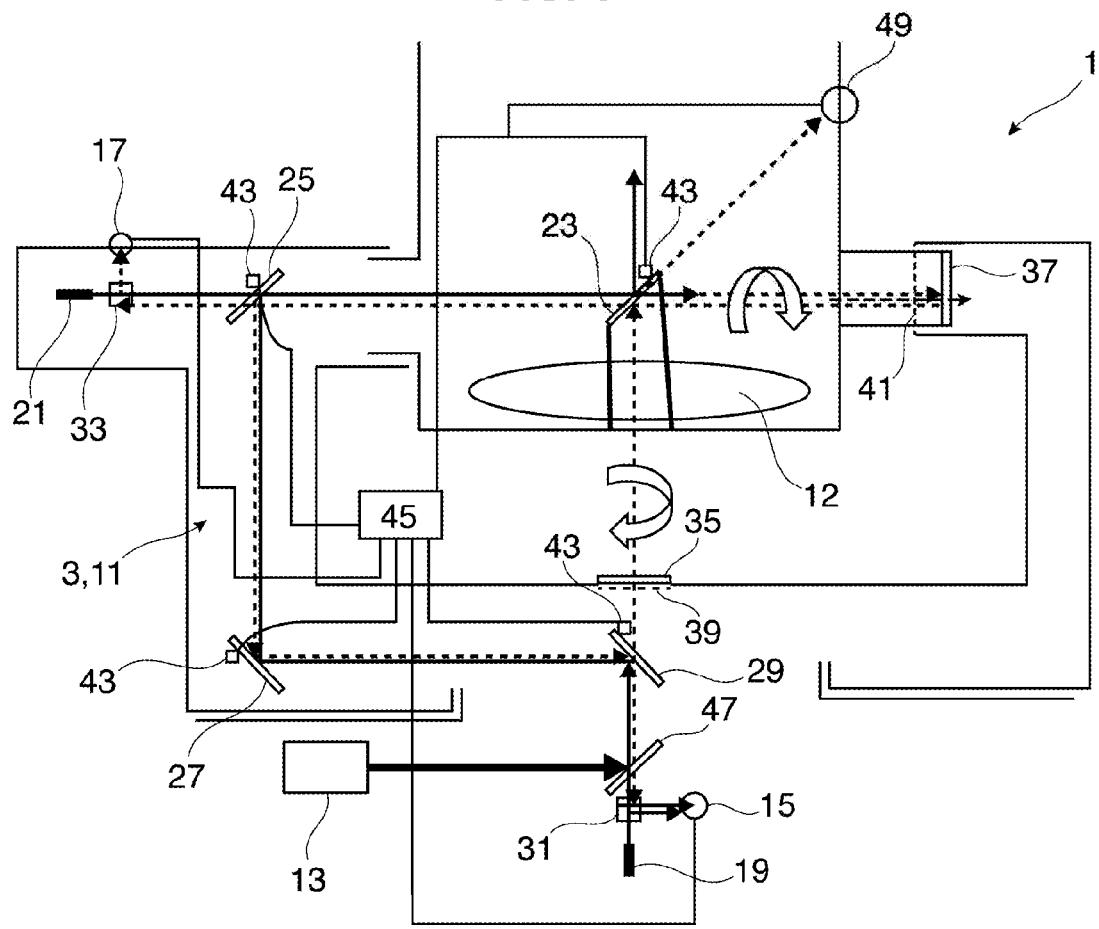
FIG. 2 illustrates a cross section of laser beam directing system according to an embodiment of the invention.

FIG. 2 illustrates a cross section of a so called Altazimuth beam directing unit with an axis of the telescope optics 12 which axis is aligned parallel to the azimuth axis. The primary laser beam of the primary laser 13 is coupled in parallel to the azimuth axis into the directing unit or in the laser beam directing system by a mirror 47 that is fixated in position. The primary laser beam is coupled into the optical axis of the telescope optics by the deflection mirrors mounted in the azimuth rotation yoke 3 or in the Coudéoptical channel 11, namely the second deflection mirror 25, the third deflection mirror 27 and the fourth deflection mirror 29 within the laser beam directing system 1 parallel to the elevation axis by the first deflection mirror 23 which is moved together with the elevation axis.

A first auxiliary laser 19 and a second auxiliary laser 21 are used as tools for adjusting the deflection mirrors 23, 25, 27 and 29. The beam of the first auxiliary laser 19 is radiated into the laser beam directing system 1 collinear with the azimuth rotation axis and the beam of the second auxiliary laser 21 collinear with the elevation rotation axis. The wavelengths of the auxiliary lasers 19, 21 differ from the wavelength of the primary laser 13 to be directed. The wavelength of the first auxiliary laser can be for example 532 nm, the wavelength of the second auxiliary laser can be for example 635 nm and the wavelength of the primary laser can be for example 1070 nm.

The optical components, in particular the first deflection mirror 23, the second deflection mirror 25, the fourth deflection mirror 29 and the fixated mirror 47 can be configured as coplanar plates. The material of the coplanar plates can thus be transparent for the wavelengths of the auxiliary lasers 19, 21. The front sides of these mirrors, this means the sides of the mirrors that are oriented towards the primary laser beam can be coated so that they are highly reflective for the primary laser radiation and partially reflective for the radiation of the auxiliary lasers. The third deflection mirror 27 can be coated with metal.

A first coplanar plate 35 is arranged in the azimuth rotation axis perpendicular thereto and fixated at the azimuth rotation yoke 3. The material of the first coplanar plate 35 is transparent for the wavelengths of the auxiliary lasers 19, 21. Furthermore the surface of the first coplanar plate 35 is provided with a coating that is partially reflective for the auxiliary laser radiation. A first aperture 39 is arranged in front of the first coplanar plate 35 in particular between the first auxiliary laser 19 and the first coplanar plate 35. The first aperture 39 is thus configured to prevent a transmission and also a reflection of the first auxiliary laser beam at the first coplanar plate 35 in a closed condition of the first aperture 39. The first aperture 39 can be opened and closed at will.

In the same way a second coplanar plate 37 is arranged in the elevation rotation axis perpendicular thereto and fixated at the support 7 of the telescope optics 12. The second coplanar plate 37 is thus configured as a planar mirror. A second aperture 41 is arranged in front of the second coplanar plate 37. The second aperture 41 prevents a reflection of the first and the second auxiliary laser beam at the second coplanar plate 37 in a closed condition of the second aperture 41. Thus, the second aperture 41 can be opened and closed at will.

The first auxiliary laser 19 is mounted fixated in place. The second auxiliary laser 21 is fixated in the azimuth yoke 3. Initially an alignment of the auxiliary lasers 19, 21 parallel to the axes can be checked and adjusted as required before starting the primary laser 13 or the laser beam directing system 1.

For this purpose the first auxiliary laser 19 is aligned to the first coplanar plate 35 while transmitting through the spatially fixated mirror 47 and the fourth deflection mirror 29 with the first aperture 39 open. In order to check the alignment a first beam splitter component 31 and the first detector 15 are used wherein the first beam splitter component is arranged downstream of the first auxiliary laser 19 and configured as a beam splitter cube.

The first beam splitter component 31 is thus provided so that its diagonal mirror surface couples out a few percent of the beam of the first auxiliary laser 19 at a right angle onto the first detector 15. The transmitted beam of the first auxiliary laser 19 is reflected back into itself by the first coplanar plate 35 and also coupled out onto the first detector 15 by the diagonal mirror surface and a mirrored surface of the first beam splitter component 31. The first detector 15 is configured, for example, as a Hartmann-Shack sensor. Thus, the first detector 15 can determine the respective tilting of the two received beams. The alignment or angular adjustment of the first auxiliary laser 19 can now be provided so that the tilting of the two beams received at the first detector 15 is identical.

The second auxiliary laser 21 can be aligned similar to the first auxiliary laser 19. The beam of the second auxiliary laser 21 is aligned perpendicular to the second coplanar plate 37 while transmitting through the second deflection mirror 25 and the first deflection mirror 23 with the second aperture 41 open. In order to check alignment a second beam splitter component 33 arranged after the second auxiliary laser 21 in its beam path and the second detector 17 are used.

The second beam splitter component 33 is configured similar to the first beam splitter component 31 and configured so that its diagonal mirror surface couples a few percent of the beam of the second auxiliary laser 21 out at a right angle onto the second detector 17. The portion of the second auxiliary laser beam transmitted through the second beam splitter component 33 is reflected back into its self by the second coplanar plate 37 and also coupled out onto the second detector 17 through a diagonal mirror surface and a mirrored surface of the second beam splitter component 33. The second detector 17 can thus be also configured as a Hartmann-Shack sensor. Using the second detector 17 the tilts of the two received beams can be determined. The alignment or angular adjustment of the second auxiliary laser 21 can now be performed so that the tilting of the two beams received at the second detector 17 is identical.

The described adjustment of the first auxiliary laser 19 and the second auxiliary laser 21 assures that the first auxiliary laser 19 is aligned with very high precision parallel to the azimuth rotation axis and the second auxiliary laser 21 is aligned with very high precision parallel to the elevation rotation axis. Using the laser beams of the auxiliary laser 19, 21 thus adjusted an adjustment of the deflection mirrors 23, 25, 27 and 29 can be performed thereafter.

For example, the first deflection mirror 23 can be adjusted or aligned by means of the auxiliary lasers 19, 21 as follows: the first deflection mirror 23 is adjusted so that the beam of the second auxiliary laser 21 reflected by the second coplanar plate 37 and the first deflection mirror 23 impacts the first detector 15 at the same angle as the beam of the first auxiliary laser 19 coupled out by the first beam splitter component 31. For control purposes the first deflection mirror 23 can be additionally simultaneously aligned so that the beam of the first auxiliary laser 19 reflected by the first reflection mirror 23 and the second coplanar plate 37 impacts the second detector 17 at the same angle as the beam of the second auxiliary laser 21 that is coupled out by the second beam splitter component 33.

Also the additional deflection mirrors 25, 27, 29 can be controlled and adjusted similar to the first deflection mirror 23. In particular the deflection mirrors 25, 27, 29 can be iteratively adjusted so that the beam of the first auxiliary laser reflected by the fourth mirror 29, the third deflection mirror 27, the second deflection mirror 25, the second coplanar plate 37 and the second beam splitter component 33 centrally impacts the second detector 17. Thus, the deflection mirrors 25, 27, 29 are furthermore iteratively readjusted so that the beam of the first auxiliary laser 19 impacts the second detector 17 at the same angle as the beam of the second auxiliary laser 21 reflected by the second beam splitter component 33.

For control purposes and in order to improve precision of alignment the deflection mirrors 25, 27, 29 can be furthermore adjusted so that the beam of the second auxiliary laser 21 reflected by the second coplanar plate 33, the second deflection mirror 25, the third deflection mirror 27, the fourth deflection mirror 29 and the first beam splitter component 31 centrally impacts the first detector 15. Thus the deflection mirrors 25, 27, 29 are furthermore iteratively readjusted so that the beam of the auxiliary laser 21 impacts the first detector 15 at the same angle as the beam of the first auxiliary laser 19 reflected by the first beam splitter component 21.

If required for differentiating the individual auxiliary lasers 19, 21, the auxiliary lasers 19, 21 can be turned on and off in a time sequential manner and the coplanar plates 35, 37 can be covered by the apertures 39, 41.

The adjustment can be performed in a static manner before starting up the primary laser 13 or the laser beam directing system 1. Alternatively the adjustment can be performed during operation of the laser beam directing system and in particular of the primary laser 13. Thus, deviations of the alignment that are caused by operational dynamic forces can be measured and corrected. The optical compensation of the deviations can be provided by motor driven adjustment elements 43. Thus two respective adjustment elements 43 can be provided at each deflection mirror 23, 25, 27, 29 wherein the adjustment elements are configured for example as piezo elements.

The adjustment elements 43 can be connected with a control unit 45. The control unit 45 can be furthermore connected with the first detector 15 and the second detector 17. Based on the data read out at the detectors 15, 17 the control unit 45 can control the control elements 43 and can readjust the deflection mirrors 23, 25, 27, 29 in this manner.

An additional control of an angular position of the first deflection mirror 23 can be provided during operations of the laser beam directing system 1 when an additional beam splitter element is provided on a backside of the deflection mirror 23, wherein the additional beam splitter element causes a partial deflection of the transmitted beams of the first auxiliary laser 19 and/or the second auxiliary laser 21 at a slant angle of for example 30°. This can be provided for example by an optical diffraction grating integrated on a back side of the first deflection mirror 23.

An angle of beams of the first auxiliary laser 19 and/or the second auxiliary laser 21 deflected in this manner can be measured by the third detector 49 provided in the wall of the telescope optics 12. A suitable correction of an angular deviation can be performed using the measuring data of the first detector 15 and the second detector 17 using the adjustment elements 43 at the deflection mirrors 23, 25, 27, 29.

Figure 3:
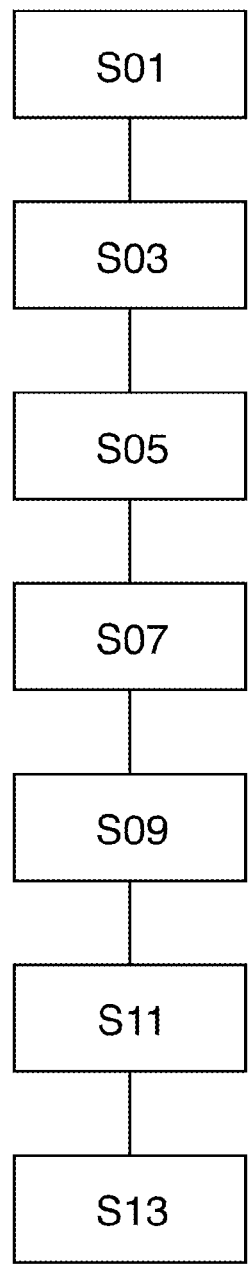
FIG. 3 illustrates a flow chart of a method for orienting optical components of a laser beam directing system according to an embodiment of the invention.

FIG. 3 illustrates a flow chart of an embodiment of a method for aligning optical components, in particular, the deflection mirrors 23, 25, 27, 29 of the laser beam directing system 1. The method can be supplemented at will by additional steps which were recited, for example, with respect to FIG. 2.

In a first step S01, the first auxiliary laser 19 as described in conjunction with FIG. 2 is aligned in parallel with the azimuth rotation axis of the laser beam directing system 1. Furthermore, the second auxiliary laser 21 is aligned in step S03 in parallel with the elevation rotation axis of the laser beam directing system 1. Subsequently the auxiliary lasers 19, 21 are radiated into the laser beam directing system in parallel to the axes. This is performed in steps S05 and S07.

In step S09 a first angle of incidence of the first auxiliary laser beam on a first detector 15 is determined. In step S11 a second angle of incidence of the second auxiliary laser beam on the first detector 15 is determined. Subsequently the optical components 23, 25, 27, 29 like, for example, the first deflection mirror 23 are adjusted in step S13 so that the first angle of incidence coincides with the second angle of incidence.

The steps of the method can thus be partially performed in an alternating sequence or in parallel with one another. For example the first auxiliary laser 19 and the second auxiliary laser 21 can be operated simultaneously. This means the steps S05 and S07 can be performed in parallel with one another. Furthermore the steps S09 and S11 can be performed in parallel with one another or sequentially.

It is appreciated that features of the embodiments and aspects of the device also are applicable for embodiments of the method and vice versa. Furthermore features can be freely combined with one another unless explicitly stated to the contrary.

In closing it is appreciated that terms like "comprising" or similar do not exclude additional elements or steps from being provided. Furthermore it is appreciated that the term "a" does not exclude a plurality. Furthermore features described in a context with various embodiments can be combined with one another at will. It is furthermore appreciated that the reference numerals in the patent claims shall not limit the scope of the patent claims.

REFERENCE NUMERALS AND DESIGNATIONS 1 laser beam directing system
3 azimuth rotation yoke
5 azimuth axis support
7 elevation axis support
9 azimuth motor
10 elevation motor
11 Coudéoptical channel
12 telescope optics
13 primary laser
15 first detector
17 second detector
19 first auxiliary laser
21 second auxiliary laser
23 first deflection mirror
25 second deflection mirror
27 third deflection mirror
29 fourth deflection mirror
31 first beam splitter component
33 second beam splitter component
35 first coplanar plate
37 second coplanar plate
39 first aperture
41 second aperture
43 adjustment element
45 control unit
47 mirror spatially fixated
49 third detector
S01 aligning the first auxiliary laser parallel to the azimuth rotation axis of the laser beam directing system
S03 aligning the second auxiliary laser parallel to the elevation rotation axis of the laser beam directing system
S05 operating the first auxiliary laser
S07 operating the second auxiliary laser
S09 determining a first angle of incidence of the first auxiliary laser beam on a first detector
S11 determining a second angle of incidence of the second auxiliary laser beam on the first detector
S13 adjusting the optical components of the laser directing system so that the first angle of incidence coincides with the second angle of incidence.

What is claimed is:

1. A laser beam directing system, comprising: a first deflection mirror which is attached at the laser beam directing system and moves with the laser beam directing system about an elevation axis of the laser beam directing system; telescope optics; a primary laser which is coupleable into the telescope optics by the first deflection mirror; a first auxiliary laser that is oriented in parallel to an azimuth rotation axis of the laser beam directing system; a second auxiliary laser that is oriented parallel to an elevation rotation axis of the laser beam directing system; a first detector, and a first beam splitter component, wherein the first auxiliary laser, the second auxiliary laser and the first detector are arranged and oriented in the laser beam directing system so that the first deflection mirror is alignable by comparing beams of the first auxiliary laser and the second auxiliary laser impacting the first detector so that a beam from the primary laser is coupleable into the telescope optics parallel to the elevation rotation axis, wherein the first beam splitter component is configured to decouple a first portion of the beams of the first auxiliary laser at a right angle onto the first detector and to let a second portion of the beams of the first auxiliary laser pass through.

2. The laser beam directing system according to claim 1, wherein the first deflection mirror has a dielectric coating, and
wherein the dielectric coating is configured so that the first deflection mirror is reflective for the primary laser and partiaily reflective for the auxiliary lasers.

3. The laser beam directing system according to claim 1, wherein the primary laser has a first wavelength,
wherein the first auxiliary laser has a second wavelength,
wherein the second auxiliary laser has a third wavelength, and
wherein the first wavelength differs from the second wavelength and from the third wavelength.

4. The laser beam directing system according to claim 1, wherein an adjustment element is provided at the first deflection mirror, and
wherein the adjustment element is configured to adjust an inclination angle or an orientation of the first deflection mirror in the azimuth rotation axis and in the elevation rotation axis.

5. The laser beam directing system according to claim 4, wherein the adjustment element is configured as a piezo motor.

6. The laser beam directing system according to claim 1, wherein the first auxiliary laser is operable simultaneously or time sequentially with the second auxiliary laser.

7. The laser beam directing system according to claim 1, further comprising;
a control unit,
wherein the control unit is configured to determine a first angle of incidence of a beam from the first auxiliary laser on the first detector and a second angle of incidence of a beam from the second auxiliary laser on the first detector, and
wherein the control unit is configured to adjust the first deflection mirror so that the first angle of incidence is identical to the second angle of incidence.

8. The laser beam directing system according to claim 1, further comprising:
a first beam splitter component,
wherein the first beam splitter component is configured to decouple a first portion of the beam from the first auxiliary laser at a right angle onto the first detector and to let a second portion of the beam from first auxiliary laser pass through, and
wherein the first beam splitter component is configured to decouple a first portion of the beam from the second auxiliary laser at a right angle onto the first detector.

9. The laser beam directing system according to claim 8, further comprising:
a first coplanar plate which is arranged physically fixated in the azimuth rotation axis of the laser beam directing system,
wherein the first coplanar plate is configured partially reflective for the first auxiliary laser and for the second auxiliary laser, and
wherein an orientation of the first auxiliary laser parallel to the azimuth rotation axis of the laser beam directing system is adjustable by the first coplanar plate, the first beam splitter component and the first detector.

10. The laser beam directing system according to claim 9, further comprising:
a first aperture,
wherein the first aperture is configured to close the first coplanar plate.

11. The laser beam directing system according to claim 1, further comprising:
a second detector,
wherein the second detector is arranged in the laser beam directing system so that the first deflection mirror is alignable by comparing beams from the first auxiliary laser and the second auxiliary laser impacting the second detector so that a beam from the primary laser is coupleable into the telescope optics parallel to the elevation rotation axis.

12. The laser beam directing system according to claim 1, further comprising:
a second deflection mirror;
a third deflection mirror; and
a fourth deflection mirror,
wherein the second deflection mirror, the third deflection mirror and the fourth deflection mirror are mounted at an azimuth rotation yoke of the laser beam directing system, and
wherein the first auxiliary laser, the second auxiliary laser and the first detector are arranged in the laser beam directing system so that the second deflection mirror, the third deflection mirror and the fourth deflection mirror are alignabie by comparing the beams from the first auxiliary laser and the second auxiliary laser impacting the first detector so that a beam from the primary laser extends parallel to the azimuth rotation axis and parallel to the elevation rotation axis in the laser beam directing system.

13. A method for orienting the first deflection mirror, a second deflection mirror, a third deflection mirror and a fourth deflection mirror of the laser beam directing system according to claim 1, comprising the steps:
operating the first auxiliary laser which is aligned parallel to the azimuth rotation axis of the laser beam directing system;
operating the second auxiliary laser which is aligned parallel to the elevation rotation axis of the laser beam directing system;
determining a first angle of incidence of a beam rom the first auxiliary laser on the first detector;
determining a second angle of incidence of a beam from the second auxiliary laser on the first detector; and
adjusting the first deflection mirror, the second deflection mirror, the third deflection mirror and the fourth deflection mirror of the laser beam directing system so that the first angle of incidence is identical with the second angle of incidence.

14. The method according to claim 13, wherein adjusting or readjusting the first deflection mirror, the second deflection mirror, the third deflection mirror and the fourth deflection mirror is performed dynamically.

15. The method according to claim 13, further comprising the steps:

aligning the first auxiliary laser parallel to the azimuth rotation axis of the laser beam directing system; and
aligning the second auxiliary aser parallel to the elevation rotation axis of the laser beam directing system.

* * * * *